May 16, 1939. H. LENTZ 2,158,331
POPPET VALVE CONTROL FOR STEAM LOCOMOTIVES
Filed Dec. 4, 1936 5 Sheets-Sheet 1

Inventor:

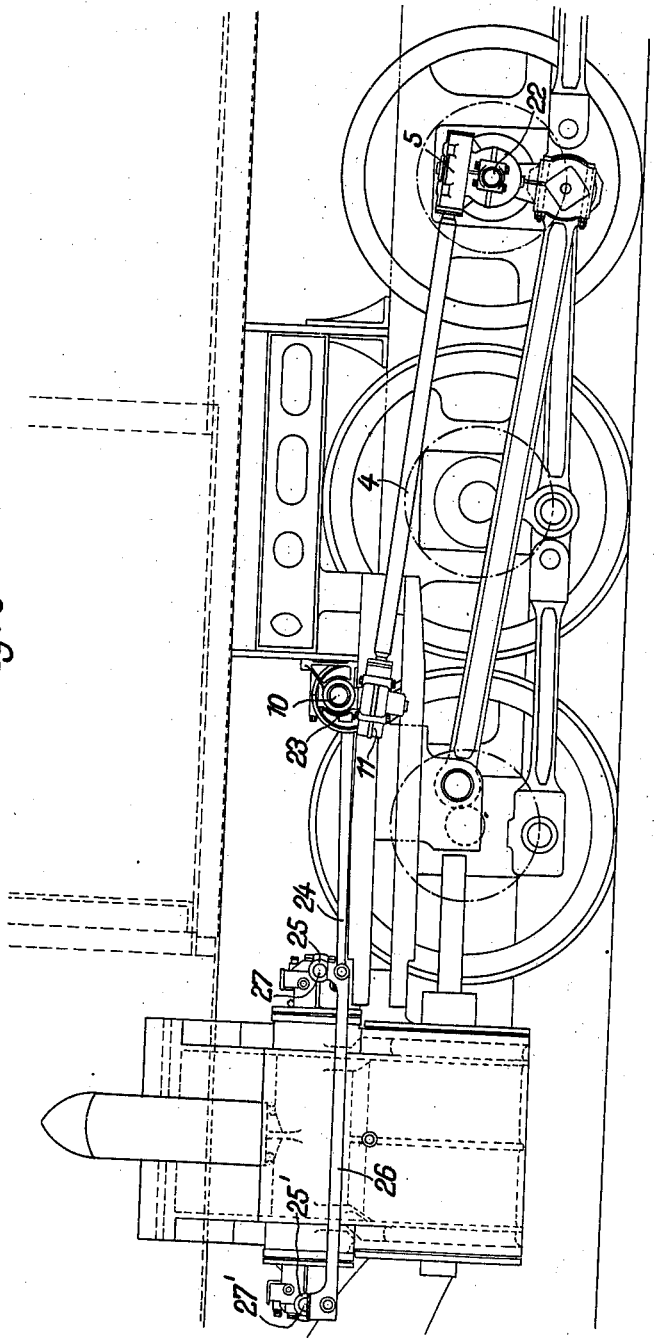

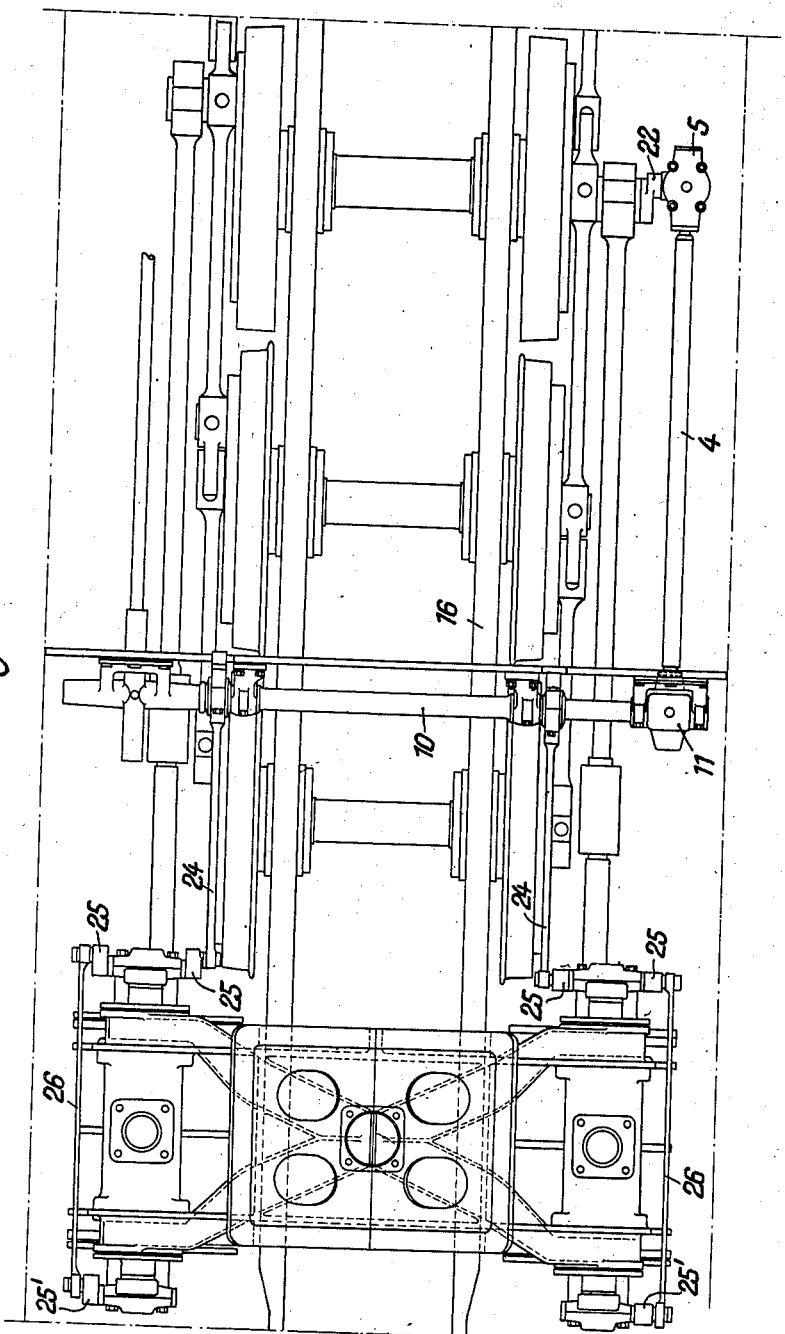

Patented May 16, 1939

2,158,331

UNITED STATES PATENT OFFICE 2,158,331

POPPET VALVE CONTROL FOR STEAM LOCOMOTIVES

Hugo Lentz, Berlin, Germany

Application December 4, 1936, Serial No. 114,190
In Germany December 7, 1935

2 Claims. (Cl. 105—119)

In locomotive steam engines with poppet valve gear the drive of which is effected from one of the driving wheel axles through an intermediate shaft with pairs of worm wheels and a transverse shaft journalled on the frame of the locomotive and equipped with means for operating the valves; it is known to provide the same ratio for the pair of worm wheels between the driving axle and the intermediate shaft, on the one hand, and for the pair between the intermediate shaft and the transverse shaft, on the other hand, to arrange the intermediate shaft between the driving axle and the transverse shaft, and to mount the ends of the intermediate shaft in housings mounted to oscillate about the driving axle and about the transverse shaft, respectively. With a control for the valves as described, the transverse shaft rotates uniformly at the same velocity as the driving shaft, notwithstanding the relative vertical displacement of the axle and the shaft due to the play of the springs on which the frame is suspended. The intermediate shaft is therefore able to partake in the said relative vertical displacement, but not to displacements transversely to the frame which, although they are not great, have a detrimental influence on the transmission due to unequal resistances in the gear. In order to overcome this inconvenience the intermediate shaft with its bearings is, according to the invention, arranged oscillatable in the transverse direction of the locomotive frame. The intermediate shaft is capable of oscillations in lateral directions by constructing the bearings and the oscillatably suspended housings so that they together form a Cardan joint.

An embodiment of the invention is illustrated by way of example in the acccompanying drawings, in which Fig. 1 shows the cam shaft drive in vertical longitudinal section, Fig. 2 is a horizontal longitudinal section of Fig. 1.

Fig. 5 shows in side elevation a cam shaft drive derived from the return crank of a locomotive.

Fig. 6 is a top plan view of Fig. 5.

Figure 1:
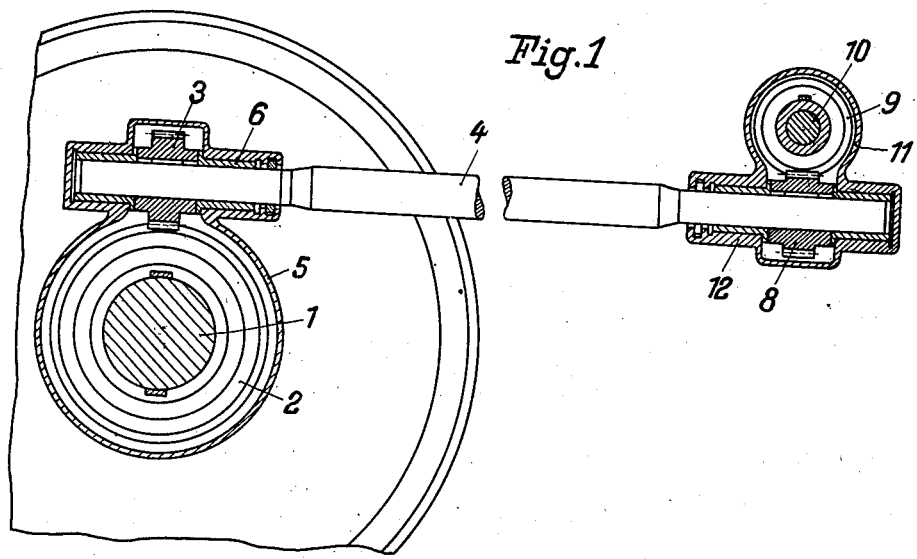
Figure 2:
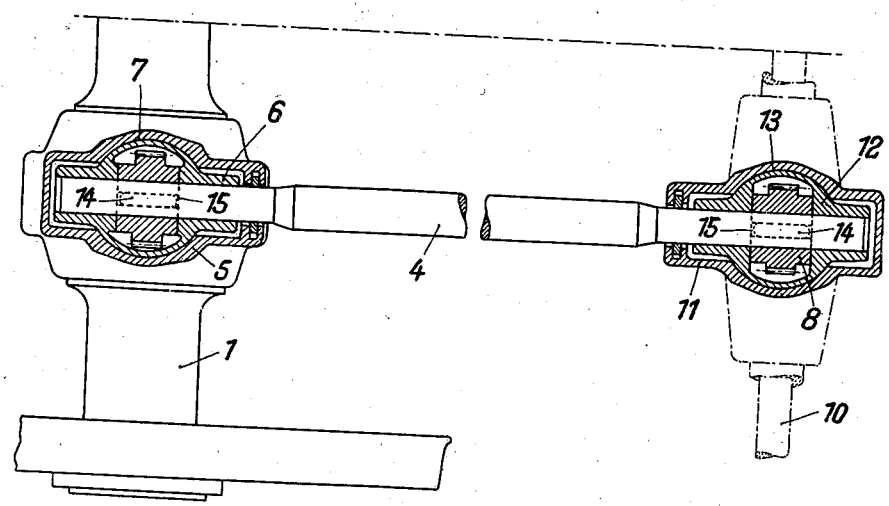

A worm wheel 2 is keyed in the middle of a driving axle 1 of the locomotive and meshes with a worm wheel 3 keyed on one end of an intermediate shaft 4, journalled in a housing 5 enclosing the worm wheels 2 and 3 by means of a bearing 6.

The bearing 6 has lateral projections 7 forming part of a cylindrical surface whose axis is at right angles to the axis of the driving axle 1, and the housing 5 has seats also forming part of a cylindrical surface and placed on the projections 7 so that the contacting surfaces of the bearing 6 and the housing 5 are parts of a cylinder whose axis is at right angles to the axis of the driving axle, and the intermediate shaft 4 is free to oscillate laterally and to partake in the axial movement of the driving axle 1.

A similar arrangement is provided for the front end of the intermediate shaft 4. A worm wheel 8 is mounted on this end for cooperation with a worm wheel 9 keyed on a transverse shaft 10 which is mounted to rotate in the frame of the locomotive. The two wheels are arranged in a housing 11 in which the front end of the intermediate shaft is mounted through the medium of a bearing 12. The bearing has lateral projections 12 forming part of a cylindrical surface whose axis is at right angles to the axis of the transverse shaft 10, and the housing 11 has corresponding seats. By these means, the intermediate shaft 4 is free to oscillate laterally to a slight extent at its front end also.

As the housings of the two pairs of worm wheels are oscillatable about their respective shafts, they form Cardan joints together with the guides 7 and 13, these Cardan joints adapted to accommodate besides the vertical also the lateral movements. In order to take into consideration the changes in distance between the axles occurring in the event of a displacement, the worm wheels are connected with the intermediate shaft 4 by key 14 and groove 15 so that the worm wheel 8 can shift axially on the shaft the distance actually necessary.

Since the ration of the pairs of worm wheels 2, 3 and 8, 9 is equal, the transverse shaft 10 rotates at the velocity of the driving axle 1 and since the intermediate shaft 4 is arranged between the transverse shaft 10 and the driving axle 1, it oscillates about the transverse shaft 10 under the influence of the spring play. The oscillation imparts a lead to the worm wheel 3 but this is balanced by a corresponding lag of the wheel 8 owing to the arrangement of the intermediate shaft and the equal ratio of the pairs of wheels. It follows that the vertical relative movement of the driving axle 1 in no way interferes with the operation of the valves.

Figure 3:
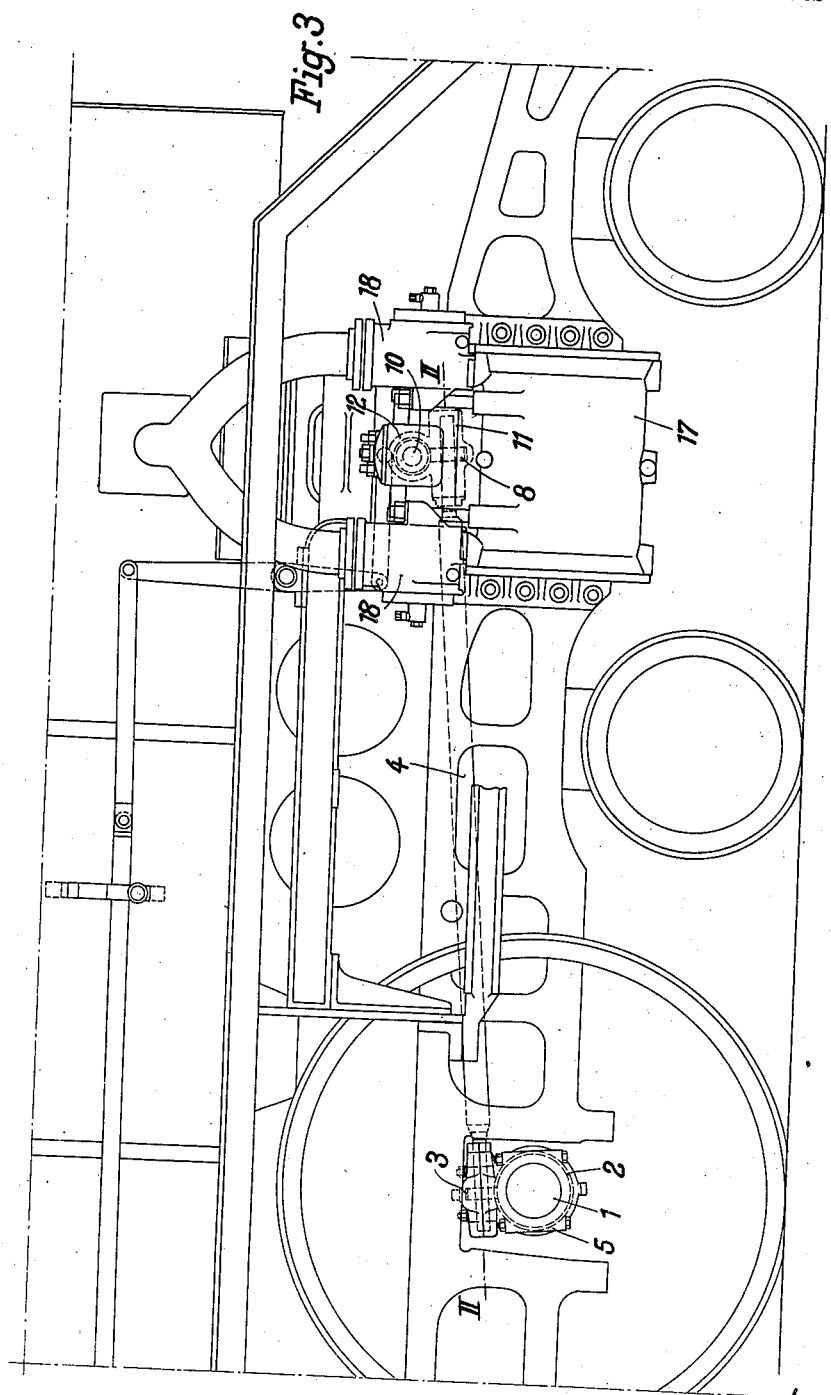
Fig. 3 shows the cam shaft drive in a locomotive in side elevation.
Figure 4:
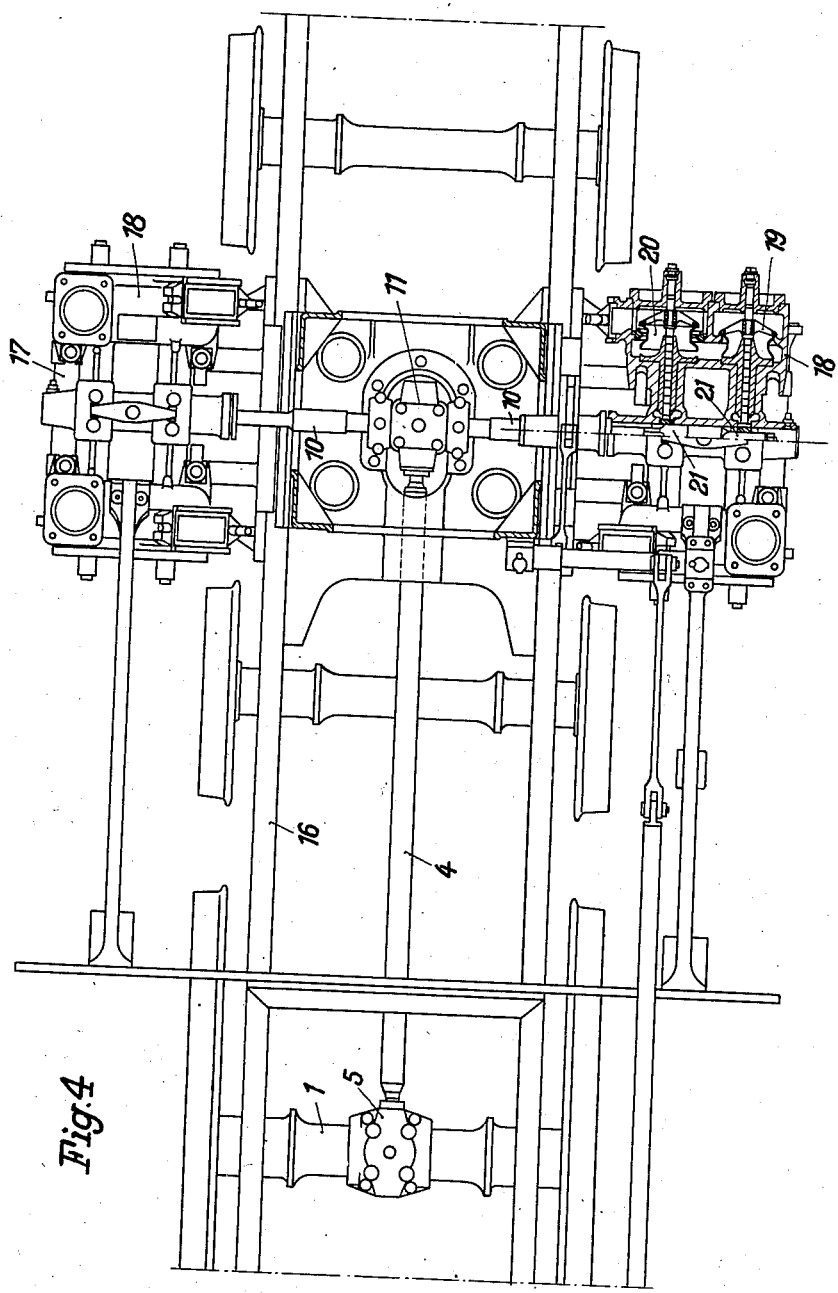
Fig. 4 is a top plan view of Fig. 3 with the valve chest of one half of a cylinder being shown in section.

Such a control drive can be arranged in various ways. Figs. 3 and 4 show an arrangement of the control drive of a locomotive with poppet valve gear with rotary cam drive. In this instance the transverse shaft 10 is at the same time the cam shaft for both the cylinders 17 arranged one on each side of the frame 16. An admission valve 19 and an exhaust valve 20 are arranged at each end of the control gear casing 18 of each cylinder. The spindles of these valves are journalled towards the middle of the cylinder which also accommodates the transverse shaft 10 carrying cams 21 for controlling these valves. The transverse cam shaft 10 with the cams is adjustable in axial direction for the purpose of adjusting the charges of the engine. It is adjusted by an adjusting device being omitted from the drawing as it does not constitute part of the invention.

The same drive can also be employed for steam locomotive engines with popet valve gear, in which the valves are controlled by oscillating control cams. This drive can be derived from a driving axle 8 or from a return crank of the locomotive.

An example of the latter type of drive is illustrated in Figs. 5 and 6. In this case the transverse shaft 10 is journalled on the frame 16 of the locomotive at some distance from the cylinders. This shaft carries control eccentrics 23 the rods 24 of which are connected with rocker levers 25 mounted one at each end of an oscillatory cam shaft 27. This cam shaft is, in the present instance, mounted on an insertable aggregate as described in applicant's copending application Ser. No. 135,164, filed April 7, 1937, which is fitted in the piston slide valve chest instead of a built-out piston slide valve, and accommodates each an admission and an exhaust valve with valve spindles mounted the one within the other and controlled by cams mounted on the cam shaft 27. At the other end of the cylinder a similar insertable aggregate is arranged, the cam shaft 27' of which is driven from the cam shaft 27 of the first aggregate in that the levers 25 and 25' are connected the one with the other by a link 26. This arrangement is particularly suitable for the conversion of out-of-date locomotives with piston slide valve gear into locomotives with poppet valve gear.

I claim:

1. A poppet valve control drive for steam locomotive engines, comprising in combination with a driving axle and the frame of a locomotive, a transverse shaft journalled in said frame, a housing oscillatable on said driving axle, a second housing oscillatable on said transverse shaft, said housings having lateral recesses forming part of a cylinder with its axis at right angles to the axis of the driving axle and to the transverse shaft respectively, a bearing in each of said housings, each bearing having lateral projections guided in the cylindrical recesses in said housings and adapted to swing about the axis of the respective cylinders, an intermediate shaft placed between the driving axle and the transverse shaft and journalled at its two ends in said bearings, the bearings forming with said housings a Cardan joint adapted to allow said intermediate shaft to adjust itself freely in space, and two pairs of transmission wheels, one pair connecting one end of said intermediate shaft with said driving axle, and the other connecting the other end of said intermediate shaft with said transverse shaft, said pairs of transmission wheels having the same ratio.

2. A poppet valve control drive for steam locomotive engines, comprising in combination with a driving axle and the frame of a locomotive, a transverse shaft journaled in said frame, a housing oscillatably supported by the axle and coaxial therewith, a second housing oscillatable on said transverse shaft, said housing having lateral recesses forming part of a cylinder with its axis at right angles to the axis of the driving axle and to the transverse shaft respectively, a bearing in each of said housings, each bearing having lateral projections guided in the cylindrical recesses in said housings and adapted to swing about the axis of the respective cylinders, an intermediate shaft placed between the driving axle and the transverse shaft and journaled at its two ends in said bearings, the bearings forming with said housings a Cardan joint adapted to allow said intermediate shaft to adjust itself freely in space, and two pairs of transmission wheels, one pair connecting one end of said intermediate shaft with said driving axle, and the other connecting the other end of said intermediate shaft with said transverse shaft, said pairs of transmission wheels having the same ratio.

HUGO LENTZ.